(12) United States Patent  
Aoki

(10) Patent No.: US 8,988,579 B2  
(45) Date of Patent: Mar. 24, 2015

(54) IMAGING APPARATUS

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/339,698

(22) Filed: Jul. 24, 2014

(65) Prior Publication Data

US 2014/0333819 A1 Nov. 13, 2014

Related U.S. Application Data

(63) Continuation of application No. PCT/JP2013/054980, filed on Feb. 26, 2013.

(30) Foreign Application Priority Data

Mar. 28, 2012 (JP) ................. 2012-073117

(51) Int. Cl.  
*H04N 5/232* (2006.01)  
*H04N 5/235* (2006.01)  
*G03B 13/02* (2006.01)  
(Continued)

(52) U.S. Cl.  
CPC ............ *H04N 5/23293* (2013.01); *G03B 13/06* (2013.01); *G03B 15/00* (2013.01); *G03B 17/20* (2013.01); *G03B 13/02* (2013.01); *H04N 5/2353* (2013.01)  
USPC .................................... 348/333.09

(58) Field of Classification Search  
CPC . H04N 5/23293; H04N 5/2353; G03B 13/02; G03B 13/06; G03B 15/00; G03B 17/20

USPC ............................ 348/333.01–333.09, 333.1, 348/333.11–333.13, 341

See application file for complete search history.

(56) References Cited

U.S. PATENT DOCUMENTS

2004/0150738 A1 8/2004 Sakimoto et al.  
2007/0153114 A1 7/2007 Ueda et al.  
(Continued)

FOREIGN PATENT DOCUMENTS

JP 6-121222 A 4/1994  
JP 2003-78785 A 3/2003  
(Continued)

OTHER PUBLICATIONS

International Search Report, issued in PCT/JP2013/054980, dated Apr. 2, 2013.

(Continued)

*Primary Examiner* — Aung S Moe  
(74) *Attorney, Agent, or Firm* — Birch, Stewart, Kolasch & Birch, LLP

(57) ABSTRACT

The present invention provides an imaging apparatus configured such that it is possible to check a long exposure subject image through a finder eye piece before actual imaging of long exposure imaging so as to recognize a subtle change in the tilt of the imaging apparatus caused when the apparatus gradually tilts over a long time period. In the imaging apparatus of the present invention, exposure control unit 60 controls an exposure time of a live view image, which is acquired by the imaging device 20, such that the exposure time is the same as that in the actual imaging, whereby it is possible to check the live view image from an eyepiece lens 52 of a finder.

16 Claims, 4 Drawing Sheets

(51) Int. Cl.
*G03B 13/06* (2006.01)
*G03B 15/00* (2006.01)
*G03B 17/20* (2006.01)

(56) References Cited

U.S. PATENT DOCUMENTS

| | | | |
|---|---|---|---|
| 2013/0188086 A1* | 7/2013 | Fujiki | 348/333.09 |
| 2013/0194479 A1* | 8/2013 | Jogetsu | 348/333.08 |
| 2014/0002709 A1* | 1/2014 | Sakurabu | 348/333.09 |
| 2014/0204262 A1* | 7/2014 | Endo | 348/333.09 |
| 2014/0211068 A1* | 7/2014 | Koyanagi et al. | 348/333.09 |
| 2014/0211069 A1* | 7/2014 | Koguchi | 348/333.09 |

FOREIGN PATENT DOCUMENTS

| | | |
|---|---|---|
| JP | 2004-85935 A | 3/2004 |
| JP | 2004-235973 A | 8/2004 |
| JP | 2009-303258 A | 12/2009 |
| JP | 2010-2475 A | 1/2010 |
| JP | 2010-103790 A | 5/2010 |

OTHER PUBLICATIONS

Written Opinion of the International Search Authority, issued in PCT/JP2013/054980, dated Apr. 2, 2013.

* cited by examiner

IMAGING APPARATUS

CROSS-REFERENCE TO RELATED APPLICATIONS

This application is a Continuation of PCT International Application No. PCT/JP2013/054980 filed on Feb. 26, 2013, which claims priority under 35 U.S.C. §119(a) to Japanese Patent Application No. 2012-073117 filed Mar. 28, 2012. Each of the above application(s) is hereby expressly incorporated by reference, in its entirety, into the present application.

BACKGROUND OF THE INVENTION

1. Field of the Invention

The present invention relates to an imaging apparatus, and particularly relates to an imaging apparatus that has an optical viewfinder and an electronic viewfinder and is capable of switching between the viewfinders.

2. Description of the Related Art

In the technical field of digital cameras (imaging apparatuses), until now, generally, an electronic image of a subject acquired by an imaging optical system of an imaging lens, an imaging device, and the like has been displayed on a liquid crystal monitor provided on the rear surface of the camera main body, and composition or an in-focus state is confirmed. However, recently, separately from the liquid crystal monitor of the rear surface, models having a finder for confirming composition or an in-focus state have come into widespread use. Such a finder system has an optical viewfinder (hereinafter referred to as an OVF) and an electronic viewfinder (hereinafter referred to as an EVF), and thus has advantages and disadvantages of the respective viewfinders.

Specifically, compared with the EVF, the OVF has the following certain advantages: "there is no response delay in display"; "a displayed image is sharp"; "it is easy to determine composition since outside of the imaging range is viewed (by the system)"; and so on. On the other hand, compared with the OVF, the EVF has the following advantages in use: "it is possible to display a reproduced image or a menu image (including an image in which both images overlap)"; and so on. Consequently, in a digital camera (imaging apparatus) having both the OVF and the EVF, it is preferable to appropriately switch the OVF and the EVF in accordance with a situation.

As the imaging apparatus configured to switch the finder systems, a technique described in for example JP-2009-303258A has been known. In the technique described in JP-2009-303258A, there is provided a digital single-lens reflex camera capable of switching between the OVF (in which a movable mirror is inserted into an optical path and an optical image of a subject is visible through a finder eye piece) and the EVF (in which the movable mirror is retracted from the optical path and an electronic image of the subject acquired by the imaging device is visible through the liquid crystal monitor). The EVF is capable of a live view mode (a mode for displaying a real time image, which is generated by the imaging device, on a display unit). With such a configuration, it is possible to switch between the OVF and the EVF on the basis of various operations of a user.

Further, as the imaging apparatus configured to automatically switch between the finder systems, for example, a technique described in JP-2004-85935A has been known. In the technique described in JP-2004-85935A, there is provided imaging condition determination means that determines conditions such as a remaining battery capacity, a contrast in an imaged scene, and a subject distance, whereby the OVF and the EVF are automatically switched between on the basis of a result of the determination.

SUMMARY OF THE INVENTION

However, in a case where the imaging apparatus described in JP-2009-303258A or JP-2004-85935A performs long exposure imaging in a way of switching between the OVF and the EVF, when a subject image is viewed through the finder eye piece before the actual imaging, it is difficult to check a long exposure subject image only through switching between the OVF and the EVF. Further, in the long exposure imaging, due to a subtle change in the tilt of the imaging apparatus caused when the apparatus gradually tilts over a long time period, it is difficult to obtain an appropriate recorded image.

The present invention has been made in view of the above situation, and its object is to provide an imaging apparatus capable of switching between the optical viewfinder and the electronic viewfinder, whereby it is possible to check a long exposure subject image through a finder eye piece before the actual imaging of long exposure imaging so as to recognize a subtle change in the tilt of the imaging apparatus caused when the apparatus gradually tilts over a long time period.

In order to achieve the above described object, according to the present invention, there is provided an imaging apparatus including: an imaging device that acquires a live view image before actual imaging, and acquires a recorded image, which is recorded in a recording medium in an actual imaging state; exposure control means that controls an exposure time of the live view image, which is acquired by the imaging device, before actual imaging of long exposure imaging such that the exposure time is the same as that in the actual imaging state; a imaging optical system that forms an optical image on a light receiving surface of the imaging device; a finder optical system that guides a subject image to an eye piece of a finder; display means that displays a live view image, which is obtained by the imaging device, for the finder; finder image switching means that is capable of switching between an optical image, which is guided by the finder optical system, and the live view image, which is displayed by the display means, so as to use the optical image or the live view image as a finder image viewed from the eye piece; and finder display control means that causes the finder image switching means to alternately switch between the optical image, which is guided by the finder optical system, and a long exposure live view image, which is obtained by the imaging device, so as to use the optical image or the live view image as the finder image viewed from the eye piece, before the actual imaging in the long exposure imaging state. In addition, the "live view image" is defined as an image which is output from the imaging device, is not recorded in a recording medium (is temporarily recorded in a RAM), and is displayed on the image display unit such that a photographer is able to check an angle of view, a subject, or the like before imaging or recording by pressing a shutter button.

In the present invention, by controlling the exposure time of the live view image acquired by the imaging device such that the exposure time is the same as that in the actual imaging state, it is possible to check the live view image through the eye piece of the finder. Thereby, a preview of the recorded image in the actual imaging state can be checked through the eye piece of the finder before the actual imaging of the long exposure imaging.

However, only with such a configuration, it is difficult to recognize a subtle change (subtle deviation in the angle of view) in the tilt of the imaging apparatus caused when the apparatus gradually tilts over a long time period.

Therefore, in the present invention, further, the optical image, which is guided by the finder optical system, and a long exposure live view image, which is obtained by the imaging device, are alternately switched between. Thereby, it becomes easy to recognize the subtle change in the tilt of the camera caused when the camera gradually tilts during the long exposure, and thus it becomes easy to perform the long exposure imaging.

Further, in the imaging apparatus according to the present invention, the finder image switching means may be capable of switching between a subject image in either one of the optical image, which is guided by the finder optical system, or the live view image, which is displayed by the display means, and a subject image in which both of the images overlap, and the finder display control means may switch to a subject image in which both of the optical image guided by the finder optical system and the long exposure live view image obtained by the imaging device overlap.

In the present invention, by controlling the exposure time of the live view image acquired by the imaging device such that the exposure time is the same as that in the actual imaging state, it is possible to check the live view image through the eye piece of the finder. Thereby, a preview of the recorded image in the actual imaging state can be checked through the eye piece of the finder before the actual imaging of the long exposure imaging.

However, as long as it is possible to check the live view image through the eye piece of the finder, if there is big motion in the subject image during the checking, it is difficult to check the motion.

Accordingly, in the present invention, before the actual imaging of the long exposure imaging, switching to a subject image, in which both of the optical image guided by the finder optical system and the long exposure live view image overlap, is performed.

By overlapping the long exposure live view image and the OVF, it is possible to simultaneously check appearances of the long exposure live view image and the subject image at that time through the eye piece of the finder. Thus, it becomes easy to perform the long exposure imaging.

In the present invention, it is preferable that the imaging apparatus further include subject change detection means that detects a difference between a previous subject image and a latest subject image obtained from the imaging device. It is also preferable that, in a state where the subject change detection means detects a subject change, the finder display control means cause the finder image switching means to switch a subject image, which is viewed from the finder, to a subject image which is formed by the finder optical system.

Thereby, it is possible to assist a photographer to notice the slight tilt of the imaging apparatus or the big motion in the subject image. Further, it is possible to directly check information of the subject image through the OVF.

It is preferable that the subject change detection means determine whether or not a difference value, which indicates a magnitude of the difference between the previous subject image and the latest subject image obtained from the imaging device, is greater than a threshold value which is set in advance. Alternatively, it is preferable that the subject change detection means be an acceleration sensor.

By determining whether or not the difference value indicating the magnitude of the difference between the previous subject image and the latest subject image obtained from the imaging device is greater than the threshold value which is set in advance, it is possible to assist a photographer to notice the slight tilt of the imaging apparatus or the big motion in the subject image.

Further, since the subject change detection means is the acceleration sensor, it is possible to assist a photographer to notice the slight tilt of the imaging apparatus, and it is possible to directly check information of the subject and the OVF.

In the present invention, it is preferable that the long exposure imaging take one second or more.

According to the present invention, before the actual imaging of the long exposure imaging, it is possible to check the long exposure subject image through the finder eye piece, and it is possible to recognize the subtle change in the tilt of the imaging apparatus caused when the apparatus gradually tilts over a long time period.

DESCRIPTION OF THE PREFERRED EMBODIMENTS

Figure 1:
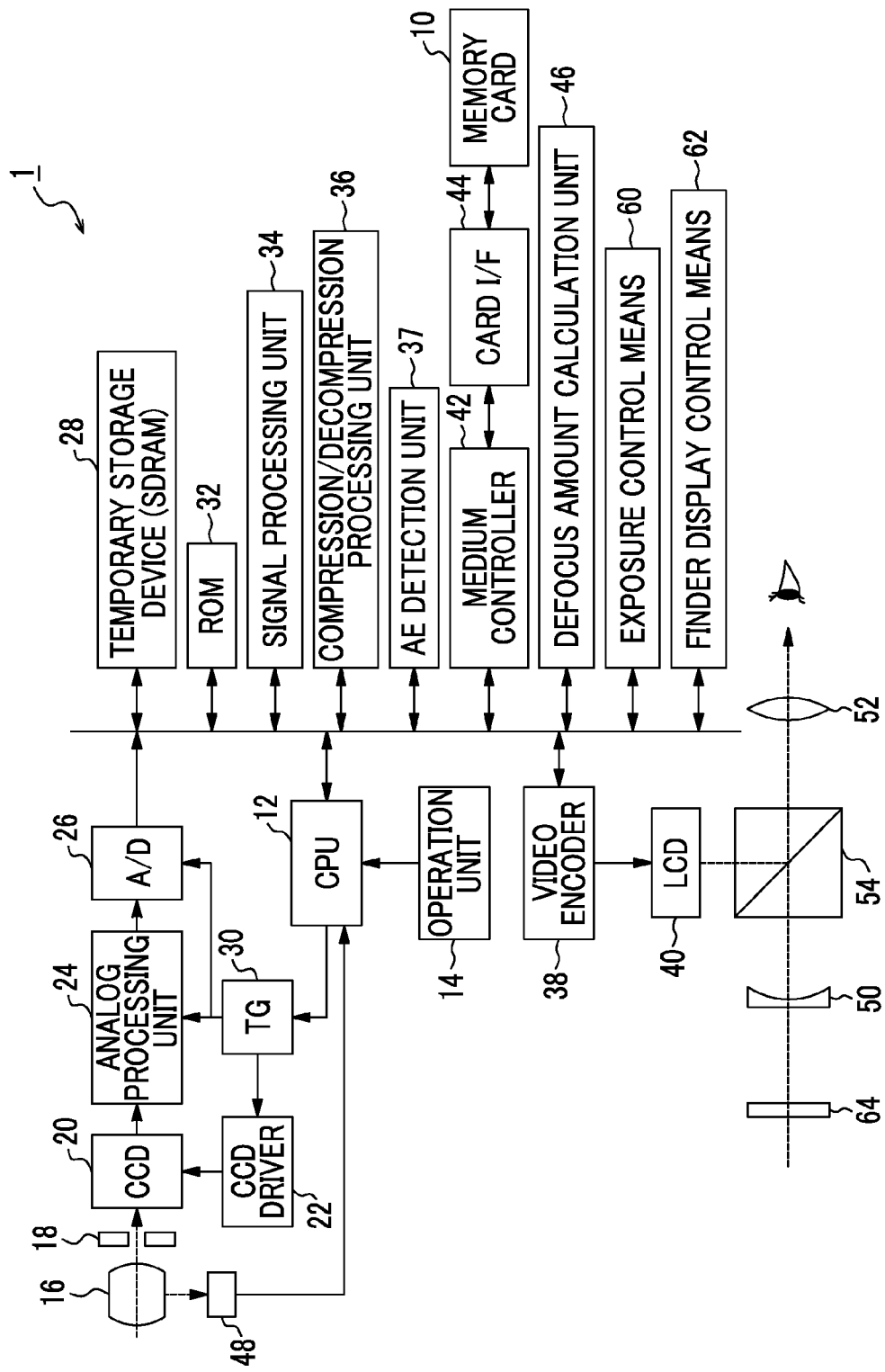
FIG. 1 is a block diagram illustrating an embodiment of an imaging apparatus according to the present invention.

Hereinafter, referring to accompanying drawings, the best modes for carrying out the present invention will be described in detail. Here, in the drawings, the elements represented by the same reference numerals and signs are elements having the same functions.

Overall Configuration of Imaging Apparatus

An overall configuration of the imaging apparatus according to the present invention will be described with reference to the drawings. FIG. 1 is a block diagram illustrating an embodiment of an imaging apparatus according to the present invention.

As shown in FIG. 1, an imaging apparatus 1 is a digital camera that records an imaged still image or a moving image in a memory card 10, and the entire operations of the camera are integrally controlled by a central processing unit (CPU) 12.

An operation unit 14 of the imaging apparatus 1 includes: a power supply switch; a shutter button; a mode change switch for switching between an optical finder mode, an electronic viewfinder mode, an optical-electronic overlap finder mode, a macro mode, a still image imaging mode, a moving image imaging mode, a reproduction mode, an automatic focus adjustment mode (AF mode), and a manual focus adjustment mode (MF mode); and arrow keys having multiple functions of outputting signals of various commands such as zooming and frame advance; and the like. Various operation signals sent from the operation unit 14 are applied to the CPU 12.

When the imaging mode is set, image light for displaying a subject is formed on a light receiving surface of an imaging device (CCD) 20 through a diaphragm 18 and an imaging optical system 16 that includes an imaging lens and a focus lens movable by a manual operation. Signal charges accumulated in the CCD 20 are sequentially read as voltage signals corresponding to the signal charges in accordance with transfer pulses sent from a CCD driver 22. In addition, the CCD 20 has a so-called electronic shutter function of controlling a charge accumulation time (shutter speed) of each image sensor at the timing of shutter gate pulses.

The voltage signals, which are sequentially read from the CCD 20, are applied to an analog processing unit 24. The analog processing unit 24 includes signal processing circuits such as a sampling hold circuit, a color separation circuit, and a gain adjustment circuit, and performs correlated double sampling (CDS) processing and color separation processing for respective color signals of R, and B so as to adjust (perform pre-white-balance processing) the signal levels of the respective color signals. The signal, which is output from the analog processing unit 24, is converted into a digital signal (hereinafter referred to as "CCDRAW data") by an A/D converter 26, and is thereafter stored in a temporary storage device 28 such as an SDRAM.

The temporary storage device 28 has a storage capacity capable of temporarily storing a plurality of pieces of the CCDRAW data. It should be noted that the storage capacity of the temporary storage device 28 be not limited to this. Further, a timing generator (TG) 30 sends a timing signal to the CCD driver 22, the analog processing unit 24, and the A/D converter 26 in accordance with the command of the CPU 12, and synchronizes the circuits in accordance with the timing signal.

A ROM 32 stores programs and adjustment values in advance, and such programs and adjustment values are appropriately read therefrom.

A signal processing unit 34 includes: a WB gain unit that adjusts the gains of R, G and B signals and performs white balance (WB) correction; a gamma correction unit that performs gamma correction in accordance with a ROM table storing predetermined gamma characteristics with respect to each of the R, G and B signals subjected to WB correction; a color interpolation processing unit that performs color interpolation processing corresponding to a color filter array of the CCD 20; a YC processing unit that performs generation processing (YC conversion) of luminance data Y and color difference data Cr and Cb; a contour enhancement unit that performs contour enhancement by attaching an aperture signal to the luminance data Y; a noise reduction processing unit that performs noise reduction processing such as smoothing processing and median filter processing; and a saturation enhancement unit that increases or decreases the gains of the color difference data Cr and Cb. The signal processing unit 34 sequentially performs signal processing of each processing unit on the CCDRAW data stored in the temporary storage device 28.

Image data processed in the signal processing unit 34 is encoded in a video encoder 38 and output to a small liquid crystal display unit (LCD) 40 which is one type of the display means, thereby displaying a subject image on a display screen of the LCD 40.

In addition, at the imaging preparation stage, images continuously imaged by the CCD 20 at predetermined intervals are subjected to image display processing, and are thereafter output to the LCD 40 and displayed as live view images.

Meanwhile, when the shutter button is fully pressed, imaging is performed through the imaging optical system 16 and the CCD 20, and the CCDRAW data stored in the temporary storage device 28 is subjected to various kinds of signal processing in the signal processing unit 34 and is converted into YC data. Thereafter, the YC data is output to the compression/decompression processing unit 36 and is subjected to predetermined compression processing such as joint photographic experts group (JPEG). Then, compression data subjected to compression processing is stored in the memory card 10 through a medium controller 42 and a card interface 44.

For example, an automatic exposure (AE) detection unit 37 integrates G signals of the entire screen or integrates G signals subjected to different weighting between a screen center part and a peripheral part, and outputs the integration values to the CPU 12. The CPU 12 calculates the luminance (imaging Ev value) of the subject by the integration values input from the AE detection unit 37, determines the F value of the diaphragm 18 and the electronic shutter (shutter speed) of the CCD 20 on the basis of this imaging Ev value in accordance with a predetermined program line map, controls the diaphragm 18 on the basis of the determined F value, and controls the charge accumulation time in the CCD 20 through the CCD driver 22 on the basis of the determined shutter speed.

Further, a defocus amount calculation unit 46 detects a phase difference between parallax images in a predetermined focus area among parallax images acquired from phase difference pixels of the CCD 20 including the phase difference pixels, and calculates a defocus amount (a focus misalignment amount) on the basis of information indicating this phase difference. In addition, it may be possible to detect the defocus amount on the basis of an output signal of for example, a known phase difference sensor including a separator lens and a sensor to detect a position, at which two images separated by the separator lens are formed, instead of the CCD 20 including phase difference pixels.

The defocus amount calculated by the defocus amount calculation unit 46 can be used to control the focus lens of the imaging optical system 16 such that the defocus amount is "0" at the time of the AF mode, and it is used to perform display control of a live view image on the LCD 40 at the time of an MF mode as described later.

Further, a focus lens position of the imaging optical system 16 is detected by a position sensor 48 and is sent to the CPU 12. On the basis of the detection output of the position sensor 48, the CPU 12 calculates the distance of the subject focused by the current focus lens position. Furthermore, the focus lens position and the subject distance corresponding to the position are stored in advance in the ROM 32 or the like, and the CPU 12 reads the subject distance corresponding to the focus lens position from this ROM 32. In addition, the subject distance may be measured by a base length triangulation sensor or the like. The subject distance measured in such a manner can be used to control the focus lens of the imaging optical system 16 at the time of the AF mode, and it is used for display control of the live view image on the LCD 40 at the time of the MF mode as described later. The position sensor 48 detects also a variable-power lens position (zoom position) of the imaging optical system 16 and outputs information of the zoom position to the CPU 12.

Further, the imaging apparatus 1 includes an optical viewfinder (OVF) having an objective lens 50, an eyepiece lens 52, and a liquid crystal shutter 64. The liquid crystal shutter 64 is controlled by the CPU 12, and becomes transparent in the case of using the optical finder. Thereby, the optical image of the subject is transmitted through the liquid crystal shutter 64, passes through the objective lens 50, and is observable through the eyepiece lens 52.

A beam splitter 54 is provided between the objective lens 50 and the eyepiece lens 52. The beam splitter 54 is used as means for synthesizing the optical image of the subject, which is incident in the objective lens 50, and the live view image which is displayed on the LCD 40. That is, the optical image, which is incident in the objective lens 50, can be observed by the eyepiece lens 52 through the beam splitter 54, and the live view image displayed on the LCD 40 can be reflected at a right angle by the beam splitter 54, and can be observed by the eyepiece lens 52.

The LCD 40, the beam splitter 54, and the eyepiece lens 52 constitute an electronic viewfinder (EVF) through which a live view image is observable. Here, by causing the liquid crystal shutter 64 to block light, only the image from the LCD 40 is observable through the eyepiece lens 52. Further, by causing the liquid crystal shutter 64 to transmit light, the live view image of the LCD 40 and the optical image transmitted through the objective lens 50 can be displayed to overlap.

That is, the imaging apparatus 1 includes a hybrid finder that is capable of switching between display of an optical image of the OVF, display of an image of the EVF, and overlap display of the images of the OVF and the EVF. That is, the imaging apparatus 1 includes finder image switching means.

Since the optical axis of the imaging optical system 16 and the optical axis of the OVF are different, an optical image and live view image in a predetermined focus area provide a parallax in accordance with the distance of the subject in the focus area. The CPU 12 moves a display position of the live view image displayed on the LCD 40 so as to correct the parallax caused in accordance with the calculated subject distance. By this means, it is possible to perform display such that the optical image and the live view image in the focus area are matched.

First Embodiment

A first embodiment of the present invention will be described with reference to the drawings.

As shown in FIG. 1, the imaging apparatus 1 according to the present invention includes exposure control means 60 and finder display control means 62.

In the present invention, before the actual imaging of the long exposure imaging, the exposure control means 60 controls an exposure time of the live view image acquired by the CCD (imaging device) 20 such that the exposure time is the same as that in an actual imaging state. That is, by controlling the exposure time of the live view image acquired by the CCD 20 such that the exposure time is the same as that in the actual imaging state, it is possible to check the live view image through the eyepiece lens (eye piece) 52 of the finder. Thereby, a preview of the recorded image in the actual imaging state can be checked through the eyepiece lens 52 of the finder before the actual imaging of the long exposure imaging.

However, only by performing the control to make the exposure time of the live view image be the same as that in the actual imaging state, it is difficult to recognize a subtle change (subtle deviation in the angle of view) in the tilt of the imaging apparatus 1 caused when the apparatus gradually tilts over a long time period.

Therefore, in the present invention, further, the finder display control means 62 alternately switches between the optical image, which is guided by the finder optical system, (optical image display of the OVF) and the long exposure live view image which is obtained by the CCD 20 (image display of the EVF).

Figure 2:
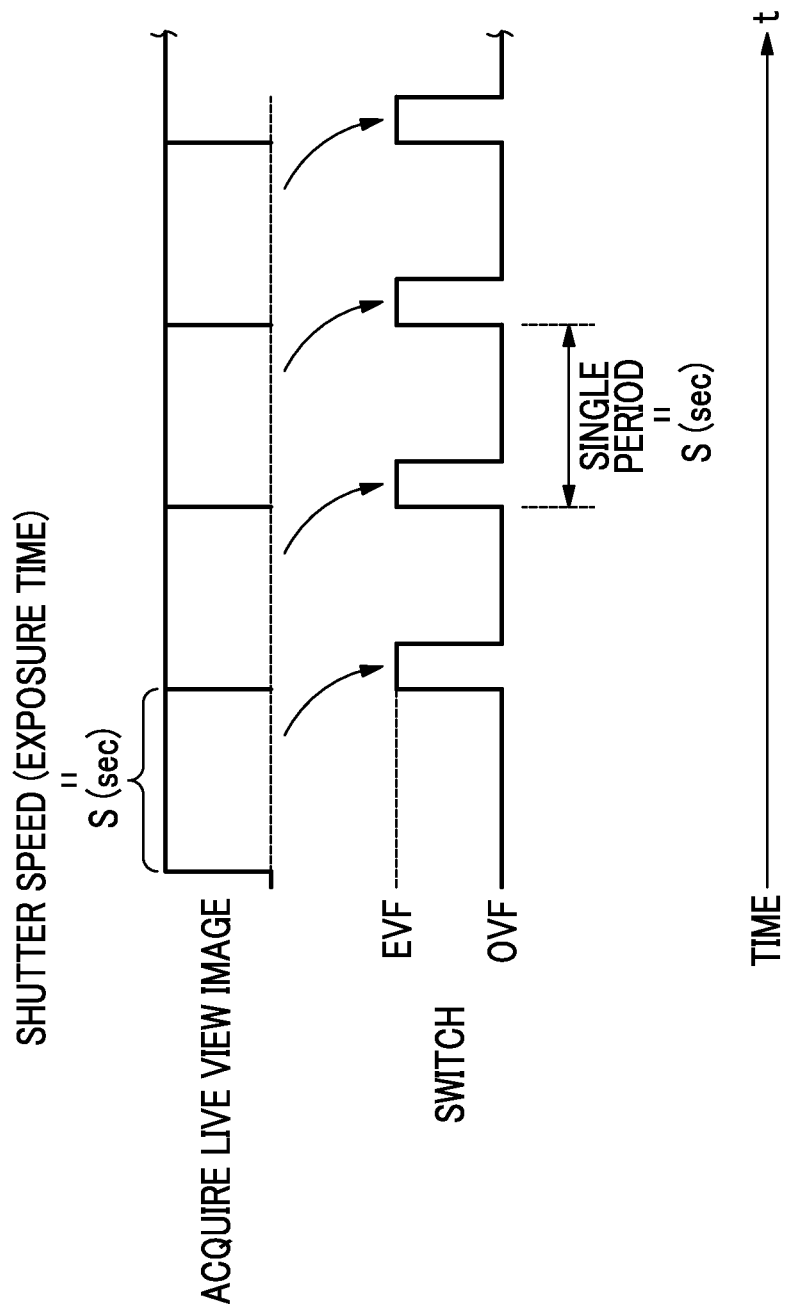
FIG. 2 is an explanatory diagram illustrating an embodiment of the present invention.

FIG. 2 is an explanatory diagram for illustrating the control to switch between the OVF and the EVF.

The exposure control means 60 accumulates electric charge in the CCD 20 through the CCD driver 22 for a time period S of the shutter speed at the time of the actual imaging. Then, the long exposure live view image is displayed on the LCD 40 through the analog processing unit 24 and the A/D converter 26. While the live view image is displayed on the LCD 40, the finder display control means 62 causes the liquid crystal shutter 64 to block light. Thereby, the live view image displayed on the LCD 40 can be recognized from the LCD 40 through the eyepiece lens 52.

Then, it is preferable that the live view image be displayed with a period of the exposure time. The finder display control means 62 alternately switches between the optical image display of the OVF and the image display of the EVF with a period S of the exposure time of the live view image. For example, at 10 sec exposure, as shown in FIG. 2, the display of the long exposure live view image of the EVF and the display of the optical image of the OVF are alternately switched between from the OVF display every 10 seconds. For example, the long exposure live view image of the EVF is displayed for one second, the optical image of the OVF is displayed for nine seconds, and the switching is repeated.

Thereby, it becomes easy to recognize the subtle change in the tilt of the imaging apparatus caused when the apparatus gradually tilts before the actual imaging of the long exposure imaging, and thus it becomes easy to perform the long exposure imaging.

It should be noted that, in the present description, the long exposure imaging means that the shutter speed is equal to or greater than one second.

Second Embodiment

A second embodiment of the present invention will be described with reference to the drawings.

As shown in FIG. 1, the imaging apparatus 1 according to the present invention includes the exposure control means 60 and the finder display control means 62.

In the present invention, in a similar manner to the first embodiment, before the actual imaging of the long exposure imaging, the exposure control means 60 controls the exposure time of the live view image acquired by the CCD (imaging device) 20 such that the exposure time is the same as that in the actual imaging state. That is, by controlling the exposure time of the live view image acquired by the CCD (imaging device) 20 such that the exposure time is the same as that in the actual imaging state, it is possible to check the live view image through the eyepiece lens (eye piece) 52 of the finder. Thereby, a preview of the recorded image in the actual imaging state can be checked through the eyepiece lens 52 of the finder before the actual imaging of the long exposure imaging.

However, only by performing the control to make the exposure time of the live view image be the same as that in the actual imaging state, if there is big motion in the subject image during the checking, it is difficult to check the motion.

Accordingly, in the present invention, further, the finder display control means 62 performs switching to a subject image, in which both of the optical image guided by the finder optical system and the long exposure live view image overlap, before the actual imaging of the long exposure imaging.

The exposure control means 60 accumulates electric charge in the CCD 20 through the CCD driver 22 for a time period S of the shutter speed at the time of the actual imaging. Then, the long exposure live view image is displayed on the LCD 40 through the analog processing unit 24 and the A/D converter 26. Even while the live view image is displayed on the LED 40, the finder display control means 62 causes the liquid crystal shutter 64 to transmit light. Thereby, the subject image, in which both the live view image displayed on the LCD 40 and the optical image of the OVF overlap, can be recognized through the eyepiece lens 52.

As described above, by overlapping the long exposure live view image and the OVF, it is possible to simultaneously check appearances of the long exposure live view image and the subject image at that time through the eye piece of the finder. Thus, it becomes easy to perform the long exposure imaging.

Third Embodiment

Figure 3:
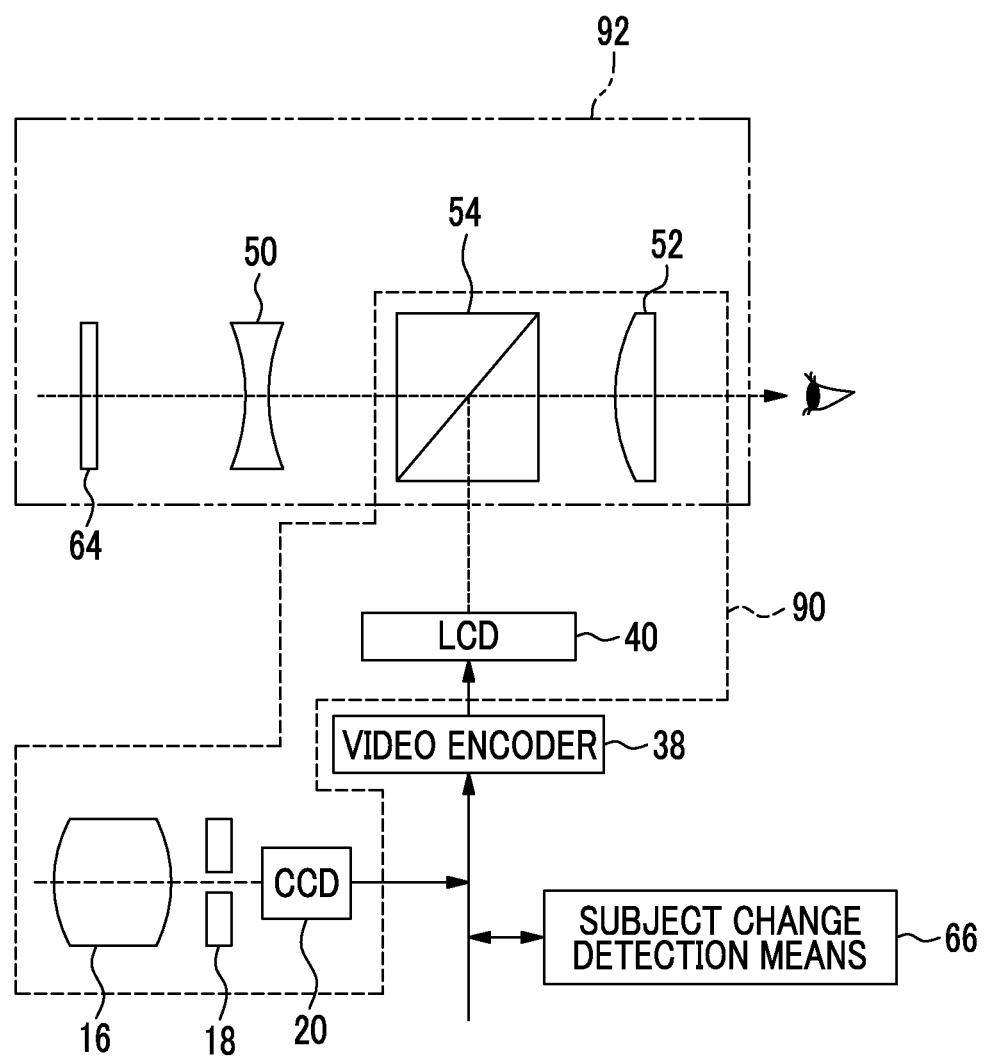
FIG. 3 is a block diagram illustrating optical systems of the OVF and the EVF.

As shown in FIG. 3, subject change detection means 66 is provided to the first and second embodiments. In addition, FIG. 3 selectively shows an EVF optical system 90 and an OVF optical system 92 of FIG. 1, and is a diagram in which the subject change detection means 66 is further provided to FIG. 1.

As described above, before the actual imaging of the long exposure imaging, the exposure control means 60 controls an exposure time of the live view image acquired by the CCD (imaging device) 20 such that the exposure time is the same as that in an actual imaging state. The subject image obtained from the CCD 20 is updated for every exposure time.

Consequently, by further providing the subject change detection means 66, the difference between the latest subject image and the previous subject image is detected. As a result, it is possible to detect the slight tilt of the imaging apparatus 1 or the big motion in the subject image.

Then, when the subject change detection means 66 detects the subject change, the subject image, which is viewed from the finder, is switched to only the subject image of the OVF optical system 92.

Thereby, it is possible to assist a photographer to notice the slight tilt of the imaging apparatus or the big motion in the subject image. Further, it is possible to directly check information of the subject image and the OVF optical system 92.

Here, it is preferable that the subject change detection means 66 determine whether or not a difference value, which indicates a magnitude of the difference between the previous subject image and the latest subject image obtained from the imaging device, is greater than a threshold value which is set in advance.

The subject change detection means 66 determines whether or not the difference value indicating the magnitude of the difference between the previous subject image and the latest subject image obtained from the imaging device is greater than the threshold value which is set in advance. Thereby, it is possible to assist a photographer to notice the slight tilt of the imaging apparatus or the big motion in the subject image.

Further, since the subject change detection means 66 is the acceleration sensor, it is possible to assist a photographer to notice the slight tilt of the imaging apparatus, and it is possible to directly check information of the subject and the OVF.

It should be noted that the subject change detection means 66 may be an acceleration sensor (not shown in the drawing). The acceleration sensor is provided in the imaging apparatus having a shift correction function in the imaging optical system 16. By using the acceleration sensor provided in the imaging apparatus, the slight tilt of the imaging apparatus is detected. When the tilt is detected, the subject image, which is viewed from the finder, is switched to only the subject image of the OVF optical system 92. Thereby, it is possible to assist a photographer to notice the slight tilt of the imaging apparatus, and it is possible to directly check information of the subject and the OVF.

Others

Figure 4:
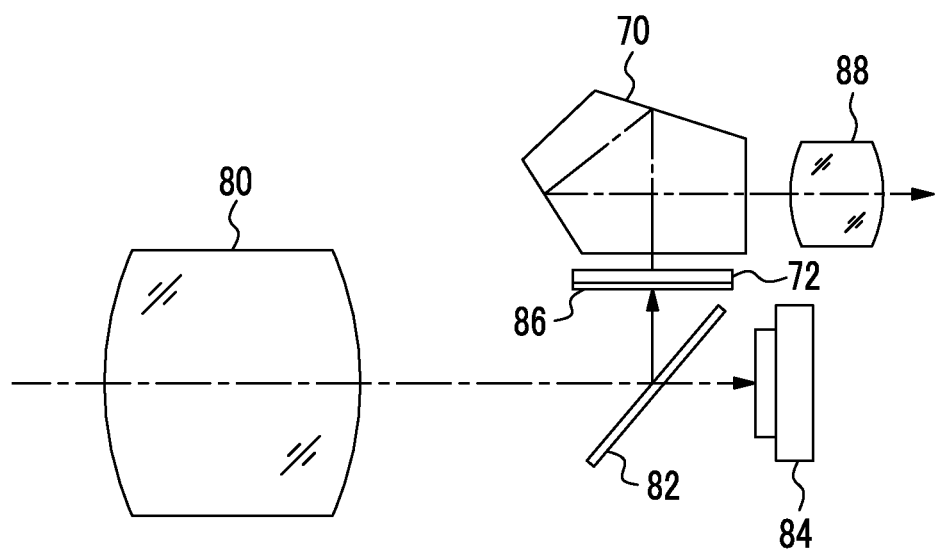
FIG. 4 is a schematic view illustrating another embodiment of the imaging apparatus according to the present invention.

Although the imaging apparatus 1 shown in FIG. 1 is applied in which the optical axis of an OVF is different from the optical axis of the imaging optical system 16, as shown in FIG. 4, the present invention can be applied to a single-lens reflex finder in which the optical axis of the OVF is the same as that of the imaging optical system 80. In addition, in FIG. 4, subject light incident in the imaging optical system 80 is incident in a CCD 84 through a semi-transparent quick return mirror 82, and a part of the light is reflected on the quick return mirror 82, and is incident on a focusing screen 86. An optical image guided into the focusing screen 86 can be checked through an eyepiece lens 88 and a pentaprism 70. Then, a transmissive LCD 72 is disposed on the focusing screen 86, and the live view image, which is imaged by the CCD 84, is displayed thereon. The live view image can be checked through the eyepiece lens 88 and the pentaprism 70 in a similar manner to the optical image. With such a configuration, the hybrid finder is formed.

The present invention is not limited to the above-mentioned embodiments, and it will be readily apparent that various design changes or modifications may be made without departing from the technical scope of the present invention.

What is claimed is:

1. An imaging apparatus comprising:
    an imaging device that acquires a live view image before actual imaging, and acquires a recorded image, which is recorded in a recording medium in an actual imaging state;
    an exposure control unit that controls an exposure time of the live view image, which is acquired by the imaging device, before actual imaging of long exposure imaging such that the exposure time is the same as that in the actual imaging state;
    an imaging optical system that forms an optical image on a light receiving surface of the imaging device;
    a finder optical system that guides a subject image to an eye piece of a finder;
    a display unit that displays a live view image, which is obtained by the imaging device, for the finder;
    a finder image switching unit that is capable of switching between an optical image, which is guided by the finder optical system, and the live view image, which is displayed by the display unit, so as to use the optical image or the live view image as a finder image viewed from the eye piece; and
    a finder display control unit that causes the finder image switching unit to alternately switch between the optical image, which is guided by the finder optical system, and a long exposure live view image, which is obtained by the imaging device, so as to use the optical image or the live view image as the finder image viewed from the eye piece, before the actual imaging in the long exposure imaging state.

2. The imaging apparatus according to claim 1,
    wherein the finder image switching unit is capable of switching between a subject image in either one of the optical image, which is guided by the finder optical system, or the live view image, which is displayed by the display unit, and a subject image in which both of the images overlap, and
    wherein the finder display control unit performs switching to a subject image in which both of the optical image guided by the finder optical system and the long exposure live view image obtained by the imaging device overlap.

3. The imaging apparatus according to claim 2, further comprising a subject change detection unit that detects a difference between a previous subject image and a latest subject image obtained from the imaging device, wherein in a state where the subject change detection unit detects a subject change, the finder display control unit causes the finder image switching unit to switch a subject image, which is viewed from the finder, to a subject image which is formed by the finder optical system.

4. The imaging apparatus according to claim 3, wherein the subject change detection unit determines whether or not a difference value, which indicates a magnitude of the difference between the previous subject image and the latest subject image obtained from the imaging device, is greater than a threshold value which is set in advance.

5. The imaging apparatus according to claim 4, wherein the long exposure imaging takes one second or more.

6. The imaging apparatus according to claim 3, wherein the subject change detection unit is an acceleration sensor.

7. The imaging apparatus according to claim 6, wherein the long exposure imaging takes one second or more.

8. The imaging apparatus according to claim 3, wherein the long exposure imaging takes one second or more.

9. The imaging apparatus according to claim 2, wherein the long exposure imaging takes one second or more.

10. The imaging apparatus according to claim 1, further comprising a subject change detection unit that detects a difference between a previous subject image and a latest subject image obtained from the imaging device,
wherein in a state where the subject change detection unit detects a subject change, the finder display control unit causes the finder image switching unit to switch a subject image, which is viewed from the finder, to a subject image which is formed by the finder optical system.

11. The imaging apparatus according to claim 10, wherein the subject change detection unit determines whether or not a difference value, which indicates a magnitude of the difference between the previous subject image and the latest subject image obtained from the imaging device, is greater than a threshold value which is set in advance.

12. The imaging apparatus according to claim 11, wherein the long exposure imaging takes one second or more.

13. The imaging apparatus according to claim 10, wherein the subject change detection unit is an acceleration sensor.

14. The imaging apparatus according to claim 13, wherein the long exposure imaging takes one second or more.

15. The imaging apparatus according to claim 10, wherein the long exposure imaging takes one second or more.

16. The imaging apparatus according to claim 1, wherein the long exposure imaging takes one second or more.

* * * * *